US012068091B2

(12) United States Patent
Wilson

(10) Patent No.: US 12,068,091 B2
(45) Date of Patent: Aug. 20, 2024

(54) OFFSHORE SUBMARINE CABLE FOR OFFSHORE WIND FARM

(71) Applicant: Ross Wilson, Royal Wootton Bassett (GB)

(72) Inventor: Ross Wilson, Royal Wootton Bassett (GB)

(73) Assignee: RWE Renewables GmbH, Essen (DE)

( * ) Notice: Subject to any disclaimer, the term of this patent is extended or adjusted under 35 U.S.C. 154(b) by 435 days.

(21) Appl. No.: 17/386,923

(22) Filed: Jul. 28, 2021

(65) Prior Publication Data

US 2021/0358656 A1 Nov. 18, 2021

Related U.S. Application Data

(63) Continuation of application No. PCT/EP2019/052002, filed on Jan. 28, 2019.

(51) Int. Cl.

*H01B 7/14* (2006.01)
*H01B 7/18* (2006.01)
*H01B 7/22* (2006.01)

(52) U.S. Cl.

CPC ............. *H01B 7/14* (2013.01); *H01B 7/1875* (2013.01); *H01B 7/22* (2013.01)

(58) Field of Classification Search

CPC ........ H01B 7/14; H01B 7/1875; H01B 7/204; H01B 7/22; H01B 7/226; H01B 7/18
USPC ...................................................... 174/106 R
See application file for complete search history.

(56) References Cited

U.S. PATENT DOCUMENTS

2014/0116565 A1* 5/2014 Gundstrup .............. F16L 11/16 138/139
2014/0166335 A1 6/2014 Kagoura et al.
2016/0301198 A1 10/2016 Manabe et al.
2018/0226176 A1* 8/2018 Marelli ................ H01B 7/0009

FOREIGN PATENT DOCUMENTS

EP 0405716 A2 1/1991
GB 2015053 A 9/1979
GB 1595513 A 8/1981
JP Hei03-74295 A 3/1991
JP 2628718 B2 7/1997
KR 101768004 B1 8/2017
KR 20180020550 A 2/2018
RU 2344505 C1 * 1/2009 ............... H01B 7/22
WO WO 2016/034243 A1 3/2016

OTHER PUBLICATIONS

Density of Steel—The Physics Factbook _Sutherland et al._Jan. 3, 2004.*

(Continued)

*Primary Examiner* — Timothy J Thompson
*Assistant Examiner* — Guillermo J Egoavil
(74) *Attorney, Agent, or Firm* — Reinhart Boerner Van Deuren P.C.

(57) ABSTRACT

An offshore submarine cable for an offshore wind farm. The offshore submarine cable has a power capacity between 3 MW and 2.5 GW, at least one weighting element having a density of at least 5 g/cm$^3$ at 20° C., and at least one armor package.

7 Claims, 3 Drawing Sheets

(56) References Cited

OTHER PUBLICATIONS

How to Determine Metal Density _Canadian Conservation Institute (CCI)_Sep. 1 to 21, 2017.*
Materials Science & Engineering 7th edition_Callister_p. 382_ 2007.*
Tyrberg et al., "Energizing the Martin Linge Offshore Oil and Gas Platform", *CIGRE Session Paper* B1-120 (Journal), Aug. 2018, pp. 1-10.
"Steel, Section: Properties", *Wikipedia* (Website), May 3, 2022, 18 pages. URL: https://en.wikipedia.org/wiki/Steel.
Worzyk, T., *Submarine Power Cables: Design, Installation, Repair, Environmental Aspects* (Book), 2009, Springer Science & Business Media, p. 34.

* cited by examiner

OFFSHORE SUBMARINE CABLE FOR OFFSHORE WIND FARM

CROSS-REFERENCE TO RELATED PATENT APPLICATIONS

This patent application is a continuation of International Application No. PCT/EP2019/052002, filed on Jan. 28, 2019, the entire teachings and disclosure of which are incorporated herein by reference thereto.

FIELD OF THE INVENTION

The application relates to an offshore submarine cable of an offshore wind farm comprising a power capacity between 3 MW and 2.5 GW. In particular, the application relates to a MV (medium voltage) offshore submarine cable comprising a power capacity between 3 MW and 70 MW and to a HV (high voltage) offshore submarine cable comprising a power capacity between 70 MW and 2.5 GW. Furthermore, the application relates to an offshore wind farm comprising at least one offshore submarine cable and to a use of an offshore submarine cable in offshore wind farms.

BACKGROUND OF THE INVENTION

Nowadays, offshore wind farms and offshore wind energy systems, respectively, are more and more used in order to generate electrical power by converting the kinetical energy of the wind into electrical energy. Generally, an offshore wind farm comprises a plurality of offshore devices, in particular, at least one offshore substation (also called offshore transformer station) and a plurality of offshore wind turbines.

By way of example, one or more string(s) of offshore wind turbines can be electrically connected with the offshore substation. In order to transmit the electrical power generated by the respective wind turbines to the offshore substation and from the offshore substation to an onshore substation, offshore submarine cables can be provided. In particular, two offshore devices can be electrically connected to each other via at least one offshore submarine cable.

However, the installation, operation and maintenance of offshore submarine cables used by an offshore wind farm involve some challenges. For instance, if the seabed conditions in the area of the offshore wind farm have a large abundance of mobile sediment, the burying of an offshore submarine cable is complex and time consuming. In addition, due to the seabed movements the offshore submarine cables, according to the prior art, will become exposed and present a heavier burden on the operational life of the asset.

In particular, the problems of offshore submarine cables, according to prior art, are the initial costs and efforts for burying a cable as deep as possible and/or to stabilize the seabed, the time needed to install the respective cable, the ongoing efforts and costs to survey and remediate the offshore submarine cable and challenges to local fisheries as the offshore submarine cable becomes exposed.

In addition, the offshore wind power industry has for a number of years protected subsea power cables and offshore submarine cables, respectively, where they either exit at fixed locations and transit into the seabed or affected by adverse environmental conditions. These systems are known in the art as Cable Protection Systems (CPS) and have been designed to reduce the mechanical stress and strain imposed on the cable system and offshore submarine cable, respectively.

CPS systems and offshore submarine cables using said CPS system, respectively, have several drawbacks. For instance, CPS systems cost money for the items, need a lot of time to install the respective offshore submarine cables, provide new failure mechanisms, provide additional interface challenges related to selecting the correct CPS for the given situation and offshore submarine cable, and provide restrictions on the burial tool, used to provide primary protection (cannot work with CPS).

BRIEF SUMMARY OF THE INVENTION

Therefore, it is an object of the present application to provide an offshore submarine cable of an offshore wind farm which reduces the foregoing described drawbacks and, in particular, enables an installation, operation and maintenance of an offshore submarine cable with reduced effort and costs.

The object is solved according to a first aspect of the present application through an offshore submarine cable according to claim 1. The offshore submarine cable comprises a power capacity between 3 MW and 2.5 GW. The offshore submarine cable comprises at least one weighting element having a density of at least 5 $g/cm^3$ at 20° C. The offshore submarine cable comprises at least one armor package.

In contrast to prior art, according to the present application, the above described drawbacks are at least reduced by an offshore submarine cable having one or more denser component(s) (than a conventional offshore submarine cable) and at least one armor package.

In particular, in contrast to the prior art, the at least one weighting element is configured to provide stabilizing effects that, as the seabed moves, the offshore submarine cable is stable and is buried with some degree of cover (protection from outside aggression). Further, the at least one armor package is configured to mitigate the mechanical stress and strain. An installation and operation of said offshore submarine cable can be conducted with reduced effort and costs.

The claimed offshore submarine cable is a specific offshore submarine cable, in particular, power submarine cable, usable (only) by offshore wind farms. In particular, an offshore device, such as an offshore substation or an offshore wind turbine, can be connected with such an offshore submarine cable in order to transmit electrical power to a further device and/or to receive electrical power from a further device.

The offshore submarine cable has a power capacity between 3 MW and 2.5 GW. In particular, cable may be a MV (medium voltage) offshore submarine cable comprising a power capacity between 3 MW and 70 MW, preferably between 9 MW and 60 MW, or a HV (high voltage) offshore submarine cable comprising a power capacity between 70 MW and 2.5 GW, preferably between 360 MW and 1500 MW. The offshore submarine cable may be a medium or high voltage offshore submarine cable, as described above. An offshore submarine cable may have a length of at least 250 m. The length may depend on the type of cable. An Inter Array cable may have a length between 250 m and 3000 m and an Export cable may have a length between 5 km and 100 km. The present offshore submarine cable may be further characterized by following parameters:

Size of the cable and the conductor material (Size MV Cables: 230 $mm^2$ and 1000 $mm^2$ (cross section of conductor); Size HV Cables: 500 $mm^2$ and 2000 $mm^2$ (cross section of conductor) Material: copper or aluminium)

Furthermore, the offshore submarine cable comprises at least one weighting element in order to weight the offshore submarine cable and offshore submarine cable system, respectively. Preferably, there may be two or more weighting elements.

Preferably, prior to actually designing an offshore submarine cable for a particular offshore wind farm, the seabed in the area of said offshore wind farm to be installed can be assessed. In particular, an assessment on the seabed mobility (fluidity of material) and, in particular MET Ocean conditions (wind, wave and climate (etc.) conditions) of the area of the offshore wind farm to be installed can be conducted in order to determine the forces acting on an exposed surface area (fully exposed cable, partially buried cable or fully buried cable). Preferably, in order to avoid heat up of the surrounding seabed close (20 cm) to the seabed surface, the cable is preferably buried with a defined burial depth of at least 1 m, preferable between 1 and 3 m.

With this assessment, the offshore submarine cable can be designed to be stable on (or in) the seabed when exposed and working with the fluid dynamics the cable would naturally sink through the fluidized material to a point where forces are equal, (self-supporting in tension). Once these forces and mass is determined the offshore submarine cable, in particular, the one or more weighting element(s) and/or the armor package can be designed such that the detected conditions can be reasonably met by while the cable can still carry out its functional design.

For instance, the at least one weighting element can be formed by an additional filler material. According to a first preferred embodiment of the offshore submarine cable according to the present application, the at least one weighting element can be formed by at least one conductor of the offshore submarine cable. The conductor can be made of copper. If the offshore submarine cable has more than one conductor, preferably, all conductors can be made of copper. Since copper has a density of approximately 8.9 g/$cm^3$ at 20° C., it is particular suitable for weighting the offshore submarine cable. The at least one conductor can form the core of the offshore submarine cable.

Alternatively or, preferably, additionally, according to a further embodiment of the present application, the weighting element may be formed by at least one shielding of the offshore submarine cable. The shielding can be made of copper or, preferably, lead. The offshore submarine cable can comprise one or more conductor(s) forming the core of the cable. The one or more conductor(s) can be surrounded by an isolation layer, for instance, made of an isolating plastic material. The isolation layer can be surrounded by an electrical shielding. In order to provide a weighted offshore submarine cable, it is proposed to make the shielding of copper or, preferably, lead. While copper has a density of approximately 8.9 g/$cm^3$ at 20° C., lead is preferred due to its density of approximately 11.3 g/$cm^3$ at 20° C. In addition, in particular, lead also provides assurance regarding water ingress.

According to a further preferred embodiment of the offshore submarine cable, the weighting element may be formed by the at least one armor package having at least one layer made of a material with a density of at least 7.5 g/cm3 at 20° C. Preferably, the at least one armor layer can comprise weighting elements made of steel. In particular, the at least one layer can comprise one or more steel rope(s) or cable(s), respectively. Steel is preferred due to its density of approximately 7.8 g/$cm^3$ at 20° C. Preferably, two or more armor layers with steel ropes and cables, respectively, can be provided. The at least one armor layer can surround the shielding layer (e.g. separated by a further isolation layer).

Preferably, in order to optimize the weight the offshore submarine cable, the at least one conductor can be made of copper, the at least one shielding can be made of lead and two or more armor layers can be provided each with steel ropes.

Furthermore, according to another embodiment of an offshore submarine cable, the armor package may be formed by a single (armor) layer, in particular, having a plurality of (twisted) (steel) ropes. The single layer may have a long lay length or a short lay length. Thereby, a long lay length is between 1.5 and 4 m, preferably, between 2 and 3 m, and a short lay length is between 1 to 2.5 m, preferably, between 1.2 and 2 m. Such an armor layer is particular suitable to mitigate the mechanical stress and strain imposed on the offshore submarine cable.

Further, an armor layer may have a preferred thickness between 3 and 5 mm.

According to a further embodiment of the present application, the armor package may be formed by two (adjacent) (armor) layers, in particular, each having a plurality of (twisted) (steel) ropes. The two layers may have same lay directions and, preferably, different lay angles. The difference between the lay angles may be up to 45°. For instance, the. Two (armor) layers with same lay directions, but different lay angles, have the advantage to provide two modes of stress relief. It shall be understood that the two layers may have, preferably, a long lay length or a short lay length.

According to another embodiment, the armor package may be formed by two (adjacent) (armor) layers, in particular, each having a plurality of (twisted) (steel) ropes. The two layers may have same lay directions and same lay angles. The lay angles may be between 30 and 75°, preferably, between 40 and 60°. Two (armor) layers with same lay directions and same lay angles have the advantage to provide better thickness and strain release (than two layers with different lay angles). It shall be understood that the two layers may have, preferably, a long lay length or a short lay length.

According to a further embodiment of an offshore submarine cable according to the present application, the armor package may be formed by two (adjacent) (armor) layers, in particular, each having a plurality of (twisted) (steel) ropes. The two layers may have opposite lay directions. Two (armor) layers with opposite lay directions have the advantage that torsional stresses can be relieved (in comparison with two layers with same lay direction). It shall be understood that the two layers can have different or same lay angles and/or a long lay length or a short lay length.

Furthermore, according to a further embodiment, the armor package may be formed by three layers (adjacent) (armor) layers, in particular, each having a plurality of (steel) ropes. The three layers may have counter lay directions with, preferably, different lay lengths.

An armor package, according to the present application, can thus be used as a weighting element with a density of at least 5 g/$cm^3$ at 20° C. configured to provide stabilizing effects and, at the same time, for mitigating stress and strain imposed on the offshore submarine cable.

A further aspect of the present application is an offshore wind farm. The offshore wind farm comprises at least two offshore devices electrically connected to each other by at least one previously described offshore submarine cable. Alternatively or additionally, the offshore wind farm comprises one offshore device and one onshore device electrically connected to each other by at least one previously described offshore submarine cable.

According to an embodiment of the offshore wind farm according to the present application, an offshore device may be a wind turbine. Alternatively or, preferably, additionally, an offshore device may be an offshore substation. Alternatively or, preferably, additionally the onshore device may be an onshore substation.

In order to provide electrical energy from renewable energy sources, offshore wind farms with at least one wind turbine are increasingly used. A wind turbine is especially adapted for converting the kinetic wind energy into electrical energy. In particular, offshore locations are usually characterized by relatively continuous wind conditions and high average wind speeds, so that increasingly so-called offshore wind offshore wind farms are built.

An offshore wind farm includes a plurality of offshore devices, such as a plurality of wind turbines and at least one offshore substation via which the offshore wind farm is electrically connected to an onshore substation. In turn, the onshore substation may be connected to a public power grid. For transmitting electrical energy between two offshore devices, medium or high voltage cables are laid in the form of the previously described submarine cables.

A still further aspect of the present application is a use of a previously described offshore submarine cable for electrically connecting at least one offshore device with at least one of a further offshore device or an onshore device.

The features of the cables, farms or uses can be freely combined with one another. In particular, features of the description and/or the dependent claims, even when the features of the dependent claims are completely or partially avoided, may be independently inventive in isolation or freely combinable with one another.

BRIEF DESCRIPTION OF THE DRAWINGS

These and other aspects of the present patent application become apparent from and will be elucidated with reference to the following figures. The features of the present application and of its exemplary embodiments as presented above are understood to be disclosed also in all possible combinations with each other.

In the figures show.

Like reference numerals in different figures indicate like elements, i.e..

Figure 1:
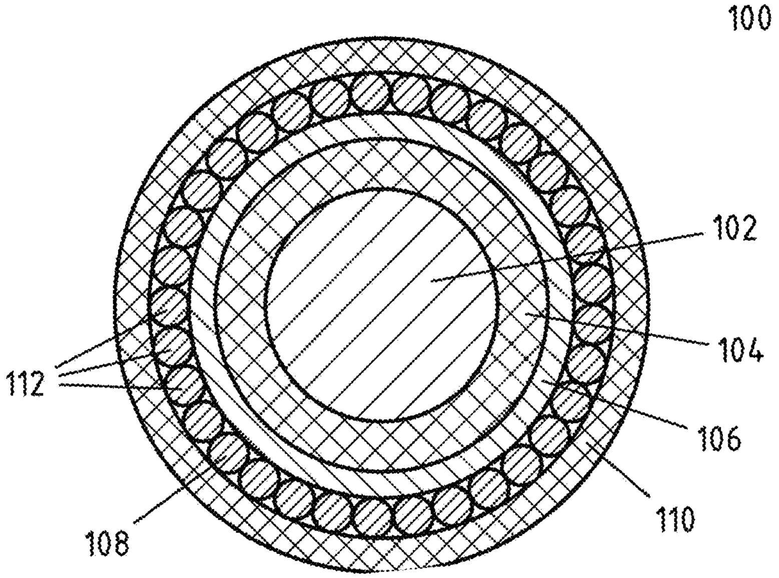
FIG. 1 a schematic view, in particular, a sectional view, of an embodiment of an offshore submarine cable according to the present application, FIG. 2 a schematic view, in particular, a sectional view, of a further embodiment of an offshore submarine cable according to the present application, FIG. 3 a schematic view, in particular, a sectional view, of a further embodiment of an offshore submarine cable according to the present application, and FIG. 4 a schematic view of an embodiment of an offshore wind farm according to the present application.
Figure 2:
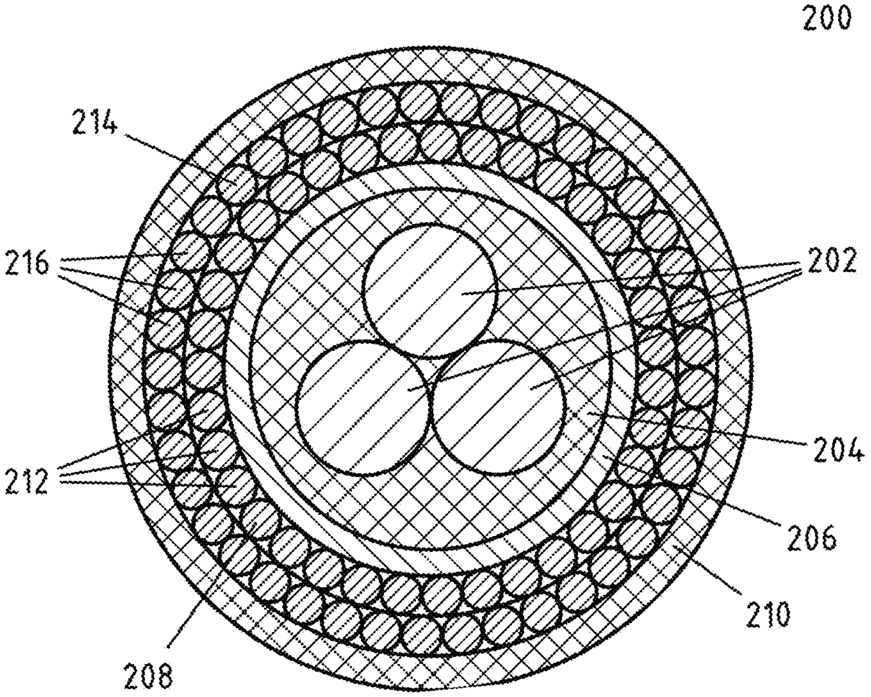
Figure 3:
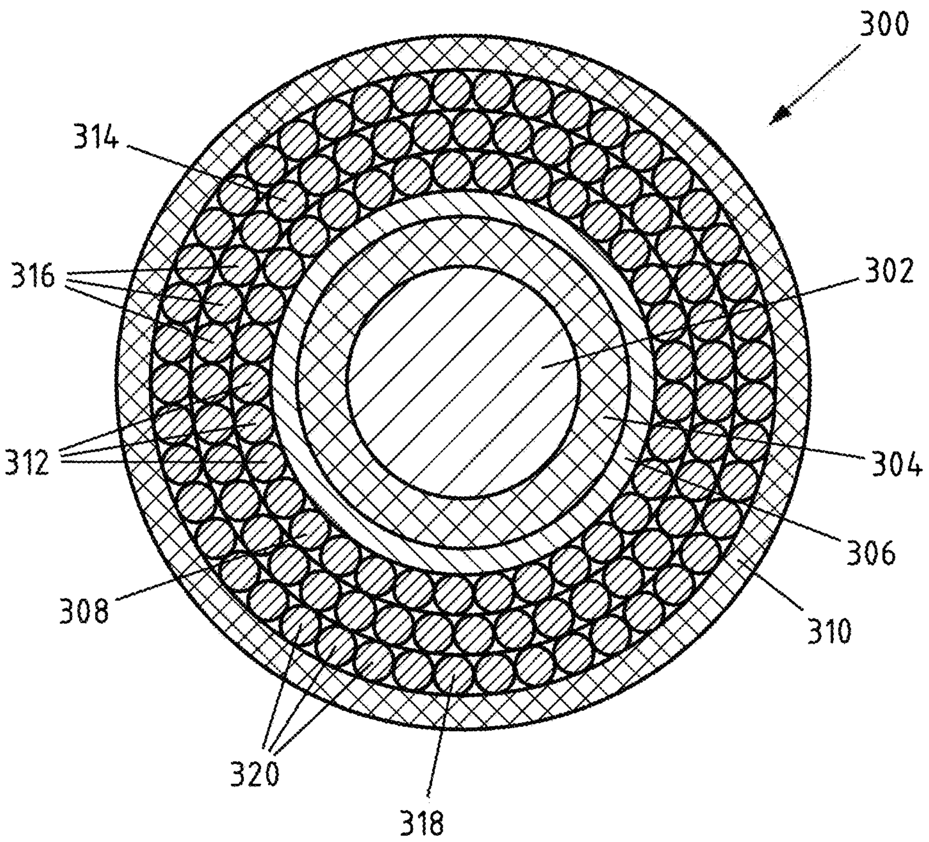

| | FIG. 1 | FIG. 2 | FIG. 3 |
|---|---|---|---|
| Conductor | 102 | 202 | 302 |
| Insulation Layer | 104 | 204 | 304 |
| Shielding | 106 | 206 | 306 |
| Outer Shell | 110 | 210 | 310. |

DETAILED DESCRIPTION OF THE INVENTION

FIG. 1 shows a schematic view, in particular, a sectional view, of an embodiment of an offshore submarine cable 100 according to the present application. The offshore submarine cable 100 is configured to be used in offshore wind farms (see FIG. 4). The offshore submarine cable 100 has a power capacity between 3 MW and 2.5 GW. In particular, cable may be a MV (medium voltage) offshore submarine cable comprising a power capacity between 3 MW and 70 MW, preferably between 9 MW and 60 MW, or a HV (high voltage) offshore submarine cable comprising a power capacity between 70 MW and 2.5 GW, preferably between 360 MW and 1500 MW. Preferably, the offshore submarine cable 100 is a medium voltage cable or a high voltage cable. For example, the offshore submarine cable 100 may be laid between a first offshore device (not shown) and another offshore device (not shown).

In the present example, the offshore submarine cable 100 comprises an electrical conductor 102 in form of a single phase conductor 102. It shall be understood that a phase conductor can be formed by a single conductor element (as shown in FIG. 1) or by two or more conductor elements (not shown) (e.g. a segmented conductor, compacted conductor etc.).

Furthermore, the depicted offshore submarine cable 100 has an (electrical) insulation layer 104 surrounding the conductor 102. As can be further seen from FIG. 1, the offshore submarine cable 100 comprises at least one shielding 106 in form of a shield layer 106 surrounding the electrical insulation layer 104.

In addition, an armor package 108 in form of a single armor layer 108 surrounds the shielding 106. It shall be understood that a further (not shown) isolation layer can be provided between shielding 106 and the armor package 108. The armor package 108 is formed by a plurality of robes 112 and cables, respectively. Further, the armor package 108 is presently surrounded by an outer shell 110.

Furthermore, filling material (not shown), in particular, with a high density (e.g. at least 5 g/cm$^3$ at 20° C.) may be provided in order to eliminate any imperfections of the offshore submarine cable 100 and in order to weight the offshore submarine cable 100.

Between the phase conductor 102 and the insulating layer 104, an inner (not shown) semiconductor layer may be arranged. In addition, an outer semiconductor layer (not shown) may be disposed between the insulating layer 104 and the shielding layer 106.

The present offshore submarine cable 100 is characterized in that it comprises an armor package 108 and one or more weighting element(s) 102, 106, 108 (and 112, respectively) each having a density of at least 5 g/cm$^3$ at 20° C. In the present example, the conductor 102 is made of copper, the shielding 106 is made of copper and the ropes 112 are made of steel. In other words, three weighting elements 102, 106, 108 (and 112, respectively) are provided wherein each of said weighting elements 102, 106, 108 (and 112, respectively) has a density of at least 7.5 g/cm$^3$ at 20° C.

In order to avoid the necessity to use a CPS system, the present offshore submarine cable 100 comprises an armor package 108 configured to mitigate mechanical stress and strain. More particularly, the offshore submarine cable 100 has a single armor layer 108 with a plurality (e.g. between 5 to 20) of steel ropes 112, wherein the layer 108 (i.e. the steel ropes 112) has a long lay length (e.g. between 2 and 3 m). It shall be understood that according to other variants of the application an armor layer may have a short lay length (e.g. between 1.2 and 2 m).

FIG. 2 shows a schematic view, in particular, a sectional view, of a further embodiment of an offshore submarine cable 200 according to the present application. In order to avoid repetitions, in the following the differences between the embodiment of FIG. 1 and the embodiment of FIG. 2 are essentially described. With regard to the other components of the offshore submarine cable 200, it is referred to the above example.

The depicted offshore submarine cable 200 comprises an electrical shielding 206. In the present case, the electrical shielding 206 is made of lead. Lead has the advantage of a higher density than copper. In addition, lead is also capable to provide assurance regarding water ingress.

Furthermore, the armor package 208, 214 includes two armor layers 208, 214. Each of the armor layers 208, 214 comprises a plurality of ropes 210, 216 made of steel. Preferably the first layer 208 may have a short lay length and the second layer 214 may have a long lay length.

Furthermore, in order to provide two modes of stress relief, the two layers 208, 214 may have same lay directions and different lay angles.

It shall be understood that according to other variants of the present application, the two layers may have same lay directions and same lay angles or opposite lay directions and same or different lay angles.

FIG. 3 shows a schematic view, in particular, a sectional view, of a further embodiment of an offshore submarine cable 300 according to the present application. In order to avoid repetitions, in the following the differences between the embodiment of FIG. 3 and the embodiments of FIGS. 1 and 2 are essentially described. With regard to the other components of the offshore submarine cable 300, it is referred to the above examples.

As can be seen from FIG. 3, the armor package 308, 314, 318 of the offshore submarine cable 300 comprises three armor layers 308, 314, 318. Each of the armor layers 308, 314, 318 comprises a plurality of ropes 312, 316, 320 made of steel. Preferably, the first layer 308 may have a short lay length, the second layer 314 may have a long lay length and the third layer may have a short lay length.

The three layers 308, 314, 318 may have counter lay directions in order to optimize the mitigation of mechanical stress and strain imposed on the offshore submarine cable 300 during installation and/or operation.

For instance, the first layer 308 may have a first lay direction, the second layer 314 may have a second lay direction opposite to the first lay direction and the third layer 318 may have a third lay direction opposite to the second lay direction (and identical with the first lay direction). It shall be understood that the lay angles may be the same or different.

It shall be further understood that according to other variants of the present application, an offshore submarine cable may comprise four or more armor layers which can be configured as described hereinbefore.

Figure 4:
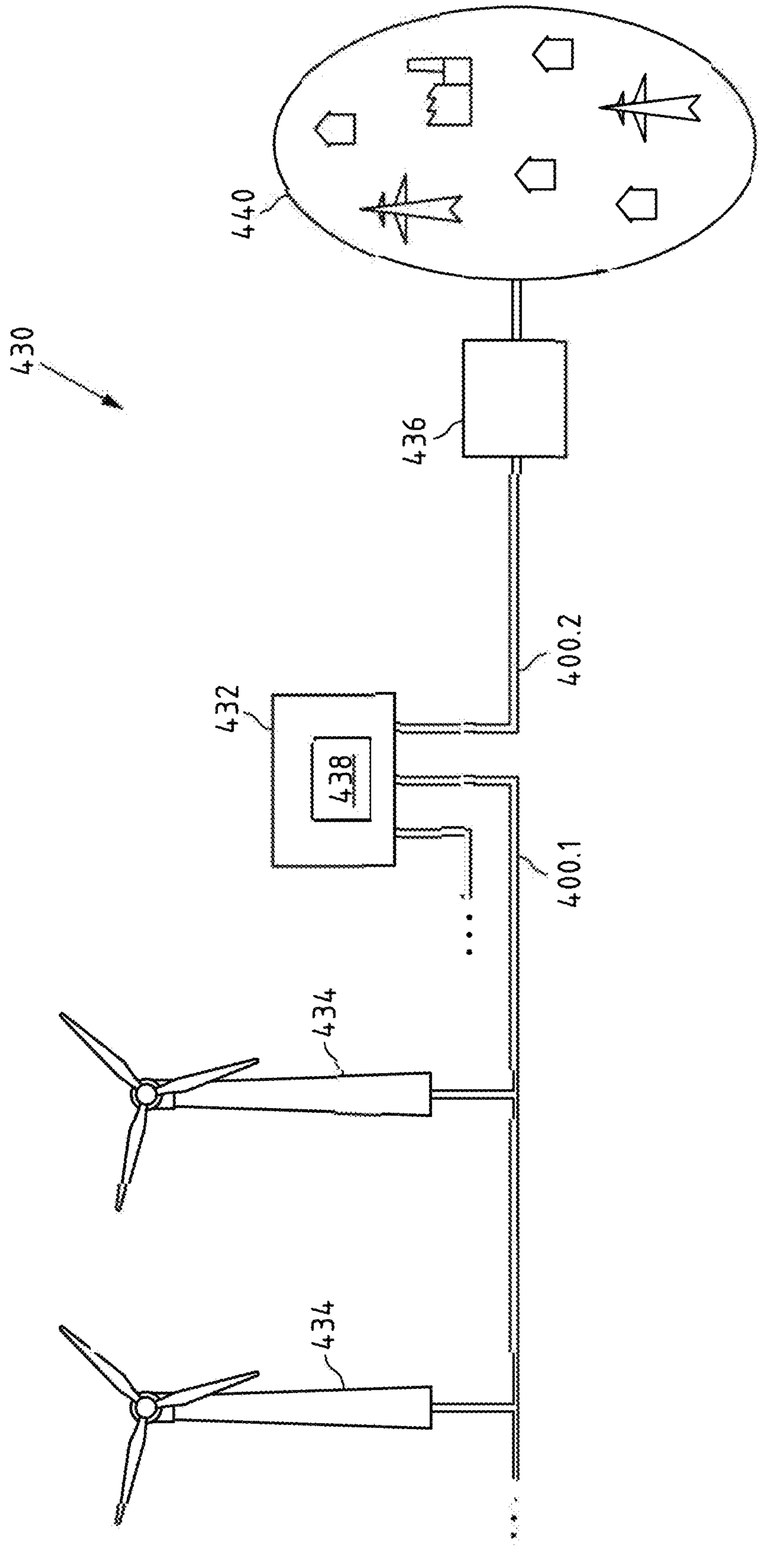

FIG. 4 shows a schematic view of an embodiment of an offshore wind farm 430 according to the present application. The offshore wind farm 430 comprises a plurality of offshore devices 432, 434. The offshore wind farm 430 comprises, in particular, at least one offshore substation 432 with at least one transformer 438 and a plurality of wind turbines 434. All wind turbines 434 can be designed substantially the same. A wind turbine 434 may include a generator (not shown) that converts the kinetic energy of the wind into electrical energy.

The wind turbines 434 may preferably be arranged in the form of at least one string. A string comprises two or more wind turbines 434 that are electrically connected in series. Preferably, a plurality of strings may be provided. One end of a string may be electrically coupled to the offshore substation 432 via at least one offshore submarine cable 400.1.

The other end of a string (not shown) may have an electrical connection to one end of another string. In normal operation of the wind farm, so in the event that there is no network fault, this electrical connection can be opened or disconnected. If a network fault occurs in one of the two strings, the electrical connection (also called a loop connection) can be closed so that electrical power can be transmitted via this connection (e.g. formed by an offshore submarine cable).

The offshore substation 432 is electrically connected to an onshore substation 436 by at least one further offshore submarine cable 400.2. The onshore substation 436 is configured to feed the electrical power into a (public) grid 440.

The offshore submarine cables 400.1, 400.2 are formed similar to the previously described offshore submarine cables 100, 200 or 300.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. Offshore submarine cable for an offshore wind farm, comprising:

a power capacity between 3 MW and 2.5 GW, at least one weighting element having a density of at least 5 g/cm$^3$ at 20° C., and at least one armor package, wherein at least one of the at least one weighting element is formed by the at least one armor package having at least one layer made of a material with a density of at least 7.5 g/cm$^3$ at 20° C., wherein the armor package is formed by three layers, wherein each of the armor layers comprises a plurality of ropes made of steel, wherein at least two of the three layers have counter lay direction and wherein at least two of the three layers have different lay lengths, and wherein each of the armor layers has a thickness between 3 and 5 mm.

2. Offshore submarine cable according to claim 1, wherein the weighting element is formed by at least one conductor of the offshore submarine cable, wherein the conductor is made of copper.

3. Offshore submarine cable according to claim 1, wherein the weighting element is formed by at least one shielding of the offshore submarine cable, wherein the shielding is made of copper or lead.

4. Offshore submarine cable according to claim 1, wherein a first layer of the armor package has a short lay length, a second layer of the armor package has a long lay length and a third layer of the armor package has a short lay length, wherein the long lay length is between 2 and 3 m, and wherein the short lay length is between 1.2 and 2 m.

5. Offshore submarine cable according to claim 1, wherein a first layer of the armor package has a first lay direction, a second layer of the armor package has a second lay direction opposite to the first lay direction and a third layer of the armor package has a third lay direction opposite to the second lay direction, which is in particular identical with the first lay direction.

6. Offshore wind farm, comprising:

at least two offshore devices electrically connected to each other by at least one offshore submarine cable according to claim 1, and/or one offshore device and one onshore device electrically connected to each other by at least one offshore submarine cable according to one of the preceding claims.

7. Use of an offshore submarine cable according to claim 1 for electrically connecting at least one offshore device with at least one of a further offshore device or an onshore device.

* * * * *